United States Patent
Kiefer, III et al.

(10) Patent No.: US 9,910,830 B2
(45) Date of Patent: *Mar. 6, 2018

(54) EDITION GRID LAYOUT

(71) Applicant: Google Inc., Mountain View, CA (US)

(72) Inventors: William Frederick Kiefer, III, Cambridge, MA (US); Maurice Bennett Shore, Carlisle, MA (US); Cassandra Lynn Doll, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 692 days.

This patent is subject to a terminal disclaimer.

(21) Appl. No.: 14/081,077

(22) Filed: Nov. 15, 2013

(65) Prior Publication Data

US 2014/0129911 A1 May 8, 2014

Related U.S. Application Data

(63) Continuation of application No. 13/312,761, filed on Dec. 6, 2011, now Pat. No. 8,612,851.

(51) Int. Cl.
| | |
|---|---|
| *G06F 17/00* | (2006.01) |
| *G06F 17/21* | (2006.01) |
| *G06F 17/30* | (2006.01) |
| *G06Q 30/02* | (2012.01) |

(52) U.S. Cl.
CPC ...... *G06F 17/212* (2013.01); *G06F 17/30905* (2013.01); *G06Q 30/02* (2013.01)

(58) Field of Classification Search
CPC .............................. G06F 17/212; G06Q 30/02

USPC ................................ 715/204, 243, 246, 253
See application file for complete search history.

(56) References Cited

U.S. PATENT DOCUMENTS

| | | | |
|---|---|---|---|
| 7,483,871 | B2 | 1/2009 | Herz |
| 7,668,885 | B2 | 2/2010 | Wittke et al. |
| 8,370,348 | B1 | 2/2013 | Reilly et al. |
| 8,612,851 | B2 | 12/2013 | Kiefer, III et al. |
| 2002/0040374 | A1 | 4/2002 | Kent |
| 2005/0033657 | A1 | 2/2005 | Herrington et al. |
| 2005/0071328 | A1 | 3/2005 | Lawrence |

(Continued)

OTHER PUBLICATIONS

"Editions by AOL," Editions.com, accessed on the world wide web at http://www.editions.com/main, accessed on Apr. 30, 2012, AOL Inc., 2011, 10 pages.

(Continued)

*Primary Examiner* — Stephen Hong
*Assistant Examiner* — Matthew Ludwig
(74) *Attorney, Agent, or Firm* — Patent Law Works LLP

(57) ABSTRACT

A system, computer-implemented method and computer-readable medium for displaying content are provided. In an embodiment, content for display within a tiled interface and a screen size for display of the tiled interface are determined. Grid segments of the tiled interface are determined based on the content and the screen size. The grid segments are grouped into tiles of the tiled interface based on a relative importance of the articles. The content is displayed on the tiled interface within the tiles of the tiled interface.

20 Claims, 8 Drawing Sheets

(56) References Cited

U.S. PATENT DOCUMENTS

| | | |
|---|---|---|
| 2006/0041548 A1* | 2/2006 | Parsons .................. G06Q 30/02 |
| 2006/0129973 A1 | 6/2006 | Newcorn et al. |
| 2008/0082903 A1 | 4/2008 | McCurdy et al. |
| 2009/0043777 A1 | 2/2009 | Wyler et al. |
| 2009/0125413 A1 | 5/2009 | Le Chevalier et al. |
| 2009/0150786 A1* | 6/2009 | Brown .............. G06F 17/30035 715/733 |
| 2009/0228774 A1 | 9/2009 | Matheny et al. |
| 2011/0060994 A1 | 3/2011 | Maxwell et al. |
| 2011/0093788 A1 | 4/2011 | Rutman et al. |
| 2011/0099071 A1 | 4/2011 | Johnson |
| 2012/0072466 A1* | 3/2012 | Ishizaki ............. G06Q 30/0269 707/803 |
| 2012/0124498 A1* | 5/2012 | Santoro ................. G06F 3/0481 715/765 |
| 2012/0159314 A1* | 6/2012 | Schrier ............. G06F 17/30905 715/252 |
| 2012/0278704 A1 | 11/2012 | Ying et al. |
| 2013/0021377 A1 | 1/2013 | Doll |
| 2013/0024757 A1 | 1/2013 | Doll et al. |
| 2013/0097186 A1 | 4/2013 | van Hoff |
| 2013/0144692 A1 | 6/2013 | Shalabi et al. |

OTHER PUBLICATIONS

"Livestand from Yahoo!" Internet Archive: Way Back Machine, Livestand.com, accessed on the world wide web at http://web.archive.org/web/20110411234034/http://www.livestand.com/, accessed on May 1, 2012, Yahoo! Inc., Apr. 2011, 1 page.

McCue, Marci, "Flipboard Launches World's First Social Magazine," Flipboard.com, accessed on the world wide web at http://flipboard.com/press/flipboard-launches-worlds-first-social-magazine, accessed on Apr. 30, 2012, Flipboard Inc., 2010-2012,3 pages.

Pulse News, Internet Archive: Way Back Machine, Pulse.me, accessed on the world wide web at http://web.archive.org/web/20110620025137/http://www.pulse.me/, accessed on May 1, 2012, Alphonso Labs, Jun. 2011, 1 page.

Non-Final Office Action for U.S. Appl. No. 13/312,761, dated Oct. 19, 2012; 12 pages.

Final Office Action for U.S. Appl. No. 13/312,761, dated May 22, 2013; 15 pages.

Notice of Allowance for U.S. Appl. No. 13/312,761, dated Aug. 16, 2013; 8 pages.

Supplemental Notice of Allowability for U.S. Appl. No. 13/312,761, dated Sep. 30, 2013; 4 pages.

* cited by examiner

EDITION GRID LAYOUT

CROSS-REFERENCE TO RELATED APPLICATION

This application is a continuation of U.S. patent application Ser. No. 13/312,761, "Edition Grid Layout," filed Dec. 6, 2011, issued as U.S. Pat. No. 8,612,851, which is hereby incorporated by reference in its entirety.

BACKGROUND

Users gain access to media content via the Internet or the World Wide Web (or simply the "Web") using websites. In one example, users enter a website address on their mobile devices to access media content. In another example, users may download an application provided by a particular content provider onto their mobile device. The application then presents a user with a media content that is periodically uploaded to the application from a content source provided by the content provider. However, the design, presentation, and publication of a media content application can be time consuming and arduous.

Moreover, because computing devices have unique specifications that include different operating platforms, a content provider heeds to tailor each application to fit the processing requirements of a particular mobile device. As a result, a content provider needs to develop and maintain multiple applications that perform the same function, so that their content can reach as many users as possible.

BRIEF SUMMARY

A system, computer-implemented method and computer-readable medium for displaying edition content are provided. In an embodiment, a screen selection corresponding to a size of a screen upon which to render a magazine edition is received. A grid is calculated for the selected screen size, the grid including multiple grid segments. A layout for the content page is determined, the layout including a tile corresponding to each of the one or more articles. Each tile includes a selection of one or more of the grid segments. Tile-content associated with each of the one or more articles is determined. The tile-content of each of the one or more articles is arranged for display within its corresponding tile. The content page of the magazine edition is displayed.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, farther serve to explain the principles of the invention and to enable a person skilled in the relevant art to make and use the invention.

Figure 1A:
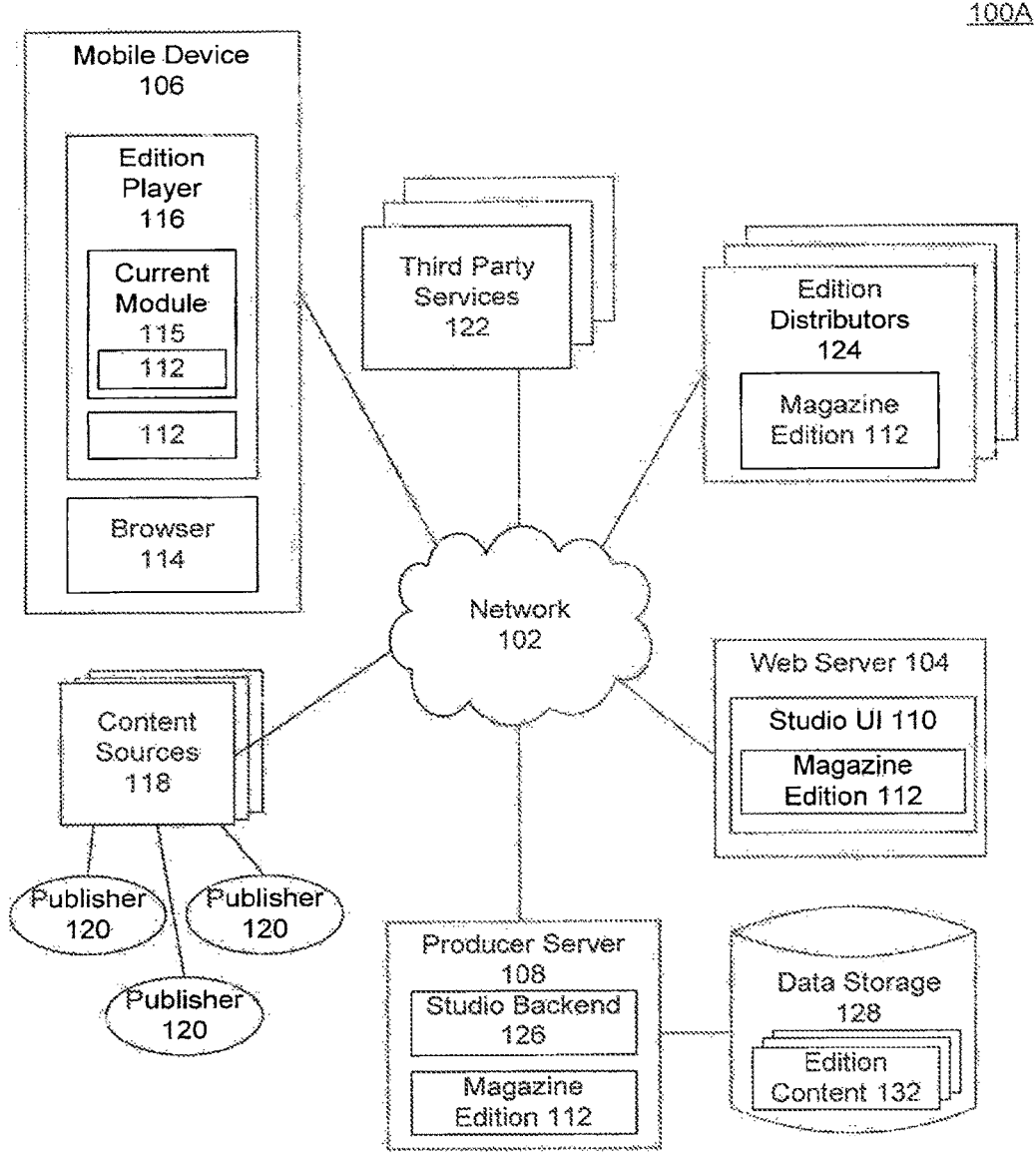
FIG. 1A is a block diagram of a distributed system environment, according to an embodiment.

Exemplary embodiments will no be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments of what is claimed herein. The detailed description is not meant to be limiting. Other embodiments are possible, and modifications can be made to the embodiments within the spirit and scope of what is described herein.

FIG. 1A is a block diagram 100A of a distributed system environment. Distributed system environment 100A includes one or more networks 102, web servers 104, producer servers 108 and mobile devices 106.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Web server 104 is a computing device or an application executing on a computing device that hosts multiple websites. A website is one or more resources associated with a domain name and hosted by one or more web servers 104. An example website is a collection of webpages formatted in hypertext markup language (HTML) that can contain text, images, multimedia content, and programming elements, such as scripts. Web server 104 hosts studio user interface ("UI") 110. Studio UI 110 enables users, such as publishers 120, to design interactive magazine editions 112 that may be distributed to multiple mobile devices 106. Publisher 120 may access studio UI 110 using a web address that is hosted on web server 104. Once accessed, publisher 120 may use studio UI 110 to design the layout of magazine edition 112 and configure content sources 118 for mobile devices 106 having different specifications.

In another embodiment, publisher 120 may download studio UI 110 onto a mobile device 106 as a standalone application or as a plugin or extension to a browser.

Magazine edition 112 may be designed using studio UI 110. Magazine edition 112 display's edition content to users in, for example, a format specified by publishers 120. However, unlike conventional applications that include a separate version for each mobile device having a particular operating platform, edition content displayed using magazine editions 112 may be displayed on mobile devices 106 in a format that is specified by a particular publisher, regardless of the native operating platform particular to mobile device 106. Magazine editions 112 may also layout edition content according to the size of a display screen of mobile device 106.

Mobile device 106 is an electronic device that is under the control of a user and is capable of requesting and receiving resources over network 102. Example mobile devices 106 are mobile communication devices such as smart phones and tablet computers. Mobile device 106 typically includes an application, such as a web browser (or simply browser) 114. A user controls browser 114 to request resources over network 102. A user requests a resource by typing the website address associated with the resources that is stored on web server 104. For example, a user, such as publisher 120 may use browser 114 to access studio UI 110 to design an interactive magazine edition using mobile device 106.

Mobile device 106 also includes edition player 116. Edition player 116 displays magazine editions 112 to users. Magazine edition 112 displays dynamic media content on mobile devices 106, where mobile devices have different specifications and display screen size. Edition content included in magazine editions 112 includes content downloaded to magazine editions 112 using content sources 118. To display magazine editions 112, edition player 116 may use a current module 115 or display edition content using edition player 116.

Current module 115 stores magazine editions 112 which are published by publisher 120. Current module 115 may be downloaded to mobile device 106 from, for example, producer server 108 using network 102, or using another interface. Typically, once current module 115 is downloaded to mobile device 106, a user uses current module 115 to subscribe to magazine editions 112. Once subscribed, current module 115 uses mobile device 106 to download magazine editions 112 from producer server 108, or edition distributor 124. Current module 115 also updates magazine edition 112 with new edition content. In an embodiment, current module 115 also provides a user with a listing of recommended magazine editions 112 that may be of interest to the user and that a user may subscribe to.

Producer server 108 includes studio backend 126. Studio backend 126 allows for a design, development and implementation of magazine editions 112. Studio backend 126 communicates with studio UI 110 when publisher 120 uses studio UI 110 to design magazine edition 112.

Once publisher 120 completes designing magazine edition 112 using studio UI 110, magazine edition 112 is uploaded to producer server 108 for storage, and distribution. In an embodiment, magazine editions 112 may be stored on producer server 108 in a memory storage described in detail in FIG. 6. In another embodiment, publisher 120 may upload magazine edition 112 to edition distributors 124. A user may access edition distributor 124 and download magazine edition 112 to mobile device 106. In an embodiment, once publisher 120 decides to distribute an upgraded magazine edition 112, mobile devices 106 that include a previous version of magazine edition 112 are synchronized with the upgraded magazine edition 112.

Content sources 118 provide edition content 132 to magazine edition 112. Example content sources 118 include data feeds, RSS feeds, social streams, user-generated media sources, multi-media sources via media RSS, etc. Content source 118 is typically associated with a publisher 120. Publisher 120 owns a particular content source 118 and controls edition content 132 that is distributed via content sources 118 over network 102.

Producer server 108 receives edition content 132 from content sources 118. Once received, producer server 108 stores edition content 132 in data storage 128. Data storage 128 may be a memory storage described in detail in FIG. 6. In an embodiment, data storage 128 may include a database for storing edition content 132. When magazine edition 112 executing on edition player 116 requests edition content 132, producer server 108 retrieves edition content 132 is retrieved horn data storage 128 and transmits edition content 132 to edition player 116.

Third party services 122 provide services to magazine, editions 112. For example, third party services 122 provide streaming video that may be accessed by a uniform resource locator ("URL") link included in magazine edition 112. In another example, third party services 122 determine that a user read a particular article included in magazine edition 112. In another example, third party services 122 provide advertisements for display within magazine edition 112. In another example, third party services 122 provide check out services for merchandise items that are provided for purchase within magazine edition 112.

Edition distributors 124 distribute applications, such as magazine editions 112 to mobile devices 106. For example, when publisher 120 designs magazine edition 112, publisher 120 may elect a particular edition distributor 124 to distribute magazine edition 112. When publisher 120 elects to distribute magazine edition 112 using a particular edition distributor 124, magazine edition 112 is uploaded to edition distributor 124. A user may then use mobile device 106 to access edition distributor 124 and upload magazine edition 112 onto mobile device 106 for an agreed upon fee.

Figure 1B:
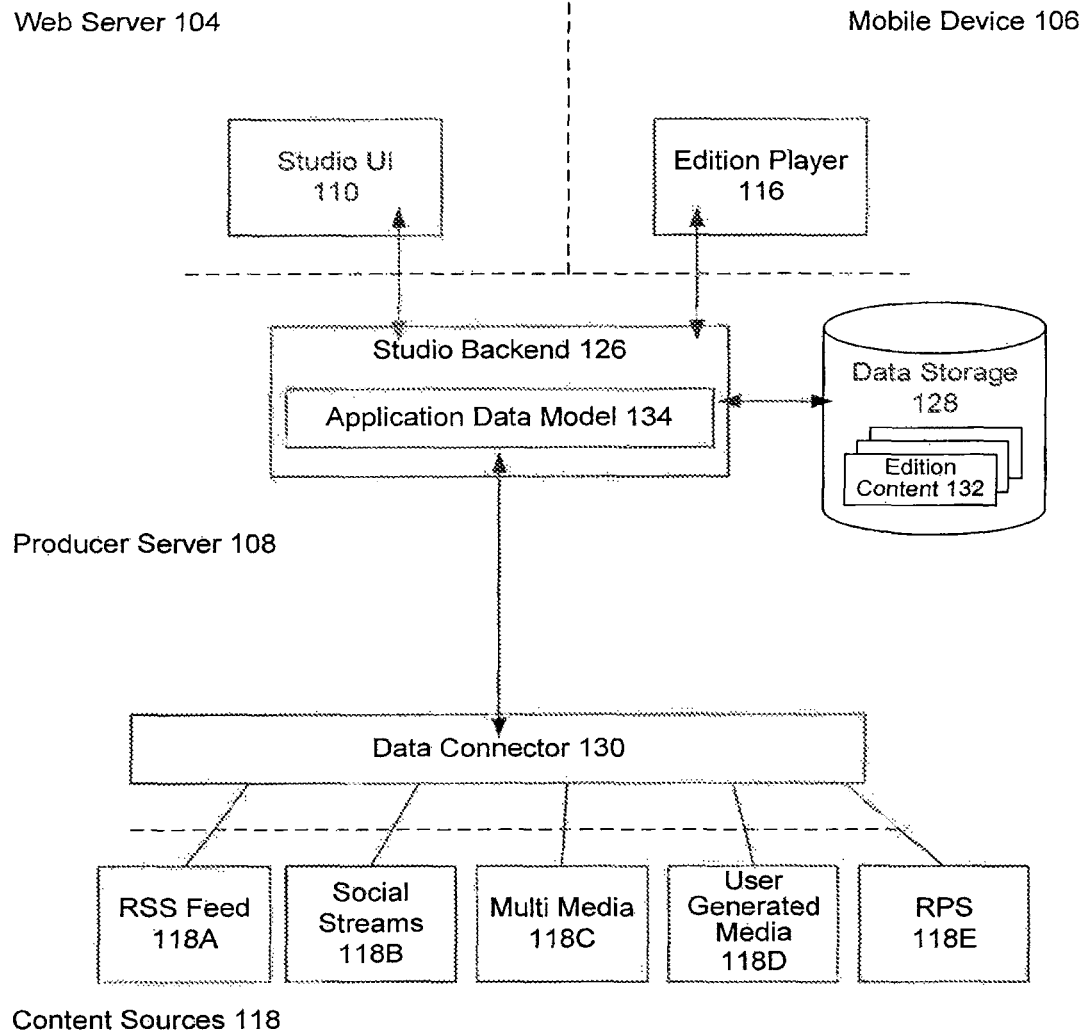
FIG. 1B is a block diagram of components in distributed system 100 that generate and distribute magazine editions, according to an embodiment.

FIG. 1B is a block diagram 100B of components in distributed system 100 that generate and distribute magazine editions.

As described herein content sources 118 provide edition content 132 that is distributed across the web via network 102. For the edition content 132 to be distributed using magazine editions 112, content sources 118 are connected to producer server 108. In an embodiment, data connector 130 connects multiple content sources 118 and retrieves edition content 132.

Data connector 130 receives data from content sources 118. Data connector 130 may receive edition content 132 from content sources 118 in real-time or at configurable intervals that may be set by a system administrator. Once data connector 130 receives edition content 132 from content sources 118, data connector 130 transmits edition content 132 to data storage 128.

As described herein, data storage 128 distributes data from content sources 118 to magazine editions 112. For example, mobile device 106 may request data for particular magazine editions 112 at configurable time intervals that may be configured by the user subscribing to magazine editions 112.

Studio backend 126 receives the designed magazine editions 112 from studio UI 110. As described herein, studio UI 110 allows publishers 120 to design dynamic and interactive magazine editions that display edition content 132 provided by their content sources 118. Once publisher 120 completes designing magazine edition 112, publisher 120 uploads magazine edition 112 to studio backend 126. Studio backend 126 then stores the uploaded magazine editions 112 on producer server 108 and/or distributes magazine editions 112 to mobile devices 106 or edition distributors 124.

Studio backend 126 includes application data model. Application data model (described in detail below), includes a format that displays edition content 132 within magazine editions 112. When publisher 120 uses studio UI 110 to create a particular magazine edition 112, studio UI 110 presents publisher 120 with application data model 134 framework that publisher 120 may configure to include edition content 120 for presentation to a user.

Upon a user request from mobile device 106, studio backend 126 may distribute magazine editions 112 to mobile devices 106. Each magazine edition 112 includes application data model 134 that is configured by publisher 120.

When magazine edition 112 is uploaded to mobile device 106, magazine edition 112 is populated with edition content 132. For example, producer server 108 provides edition content 132 from data storage 128 to magazine edition 112. As edition content 132 is updated with new edition content 132 from content sources 118, producer server 108 synchronizes edition content 132 included in magazine edition 112 with the new edition content 132 that is included in data storage 128.

In an embodiment, the synchronization may occur at configurable time intervals that may be configured by a user using mobile device 106. For example, a user may configure magazine edition 112 to query data storage 128 for new content every hour, every twelve hours, once a day, when requested by a user, etc. In a further embodiment, magazine edition 112 receives edition content 132 from data storage 128 that has been updated since the previous synchronization period, as to minimize the transmission of data over network 102.

Figure 1C:
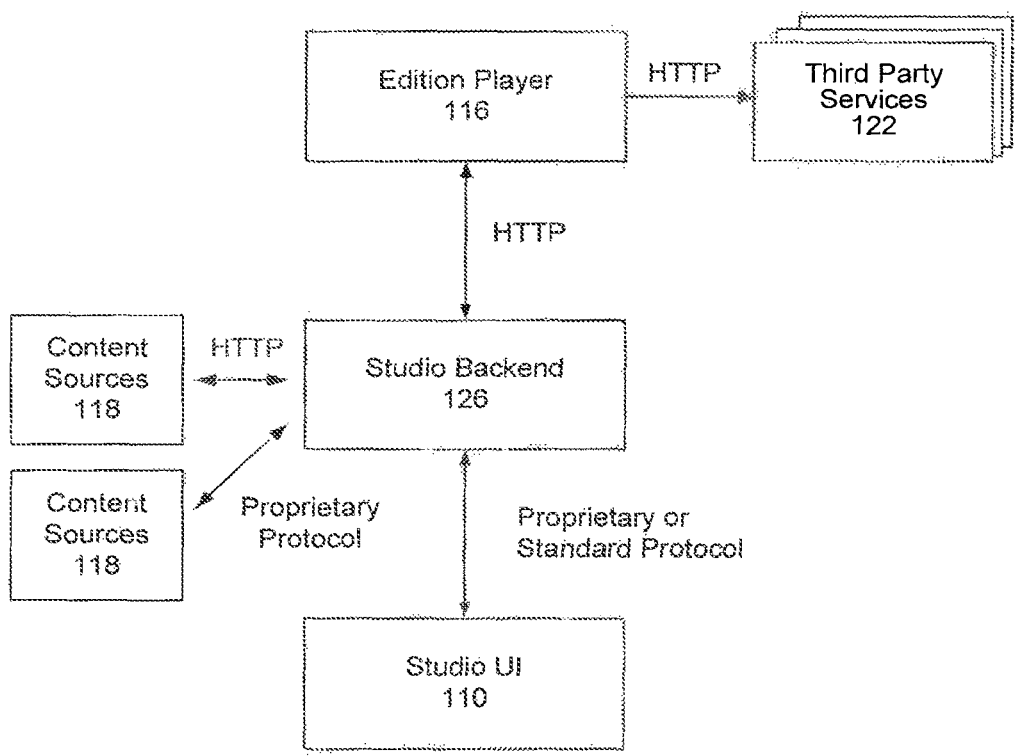
FIG. 1C is a block diagram that describes an exemplary communication interfaces between the components within the distributed system, according to an embodiment.

FIG. 1C is a block diagram 1000 that describes an exemplary communication interface between the components within the distributed system.

For example, edition player 116 may communicate with studio backend 126 using HTTP over network 102. Edition player 116 may also communicate to third party services 122 and edition distributors 124 using HTTP.

Studio UI 110 may communicate with studio backend 126 using a Google Web Toolkit ("GWT") infrastructure. A person skilled in the a will appreciate that GWT allows web application developers to design JavaScript front-end applications using source code. In an embodiment GWT uses protocol buffers, also known to a person of ordinary skilled in that art, to pass data that includes magazine editions 112, templates, edition content 132, etc., between studio UI 110 and studio backend 126.

Studio backend 126 also communicates with a variety of content sources 118. In one embodiment, studio backend 126 may be configured to communicate with content sources 118 using a proprietary communication protocol that is specified by a particular content source 118. In another embodiment, studio backend 126 may also communicate with content sources 118 using HTTP.

Figure 2:
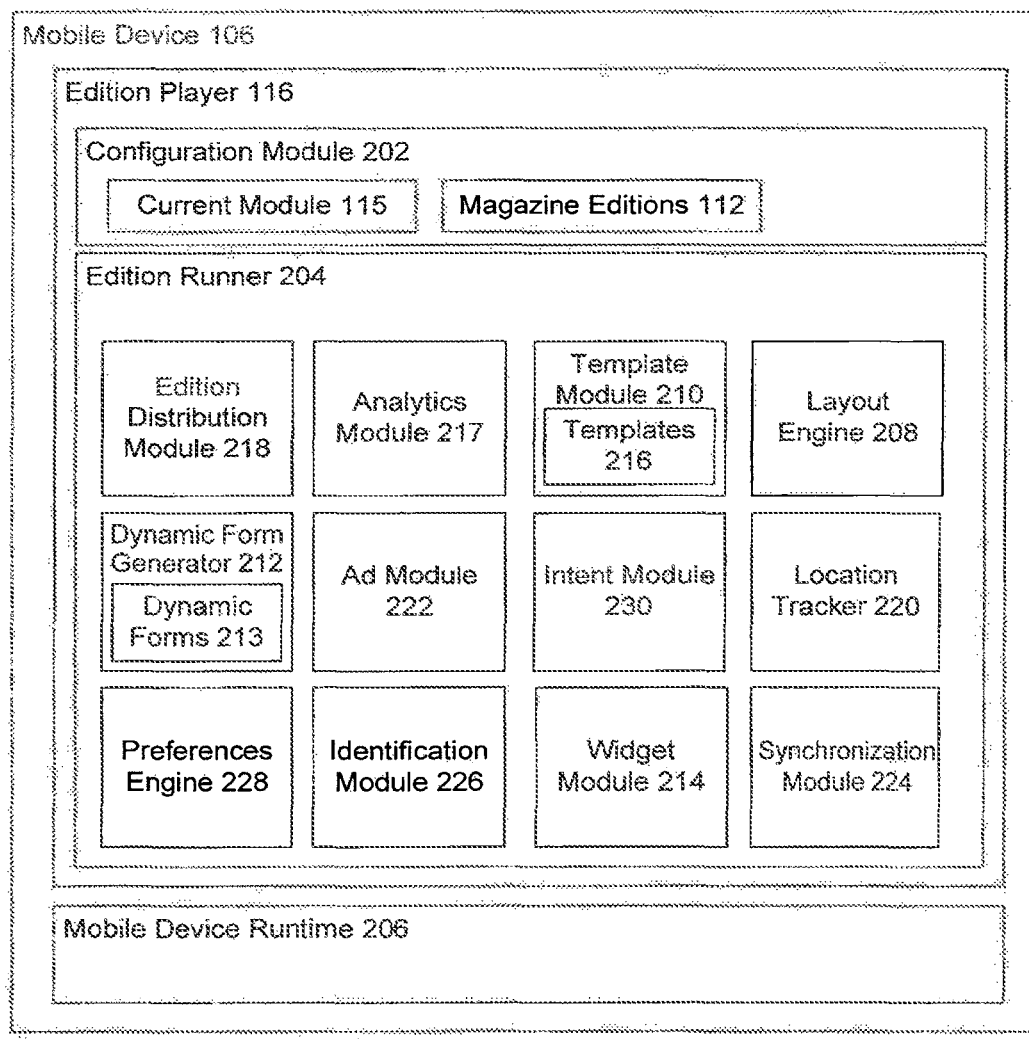
FIG. 2 is a block diagram of a system for displaying edition content of a magazine edition, according to an exemplary embodiment.

FIG. 2 is a block diagram 200 of an edition player. As described herein, edition player 116 displays magazine editions 112 to a user.

Edition player 116 includes a configuration module 202. Configuration module 202 determines a configuration mode that displays magazine edition 112 on edition player 116. For example, configuration module 202 may be configured to display magazine editions 112 using current module 115, in one embodiment. In another embodiment, configuration module 202 may be configured to display a single instance of magazine editions 112.

Edition runner 204 executes a configuration included in configuration module 202 and displays magazine editions 112. Example configuration may be executing a single instance of magazine edition 112 or executing current module 115 that provides a user with a selection of multiple magazine editions 112.

Edition runner 204 includes a layout processor 208. Layout processor 208 formats media content for display on mobile devices 106 having different specifications. Layout processor 208 receives edition content 132, using, for example, an HTML stream and generates a multi-column layout of edition content 132 that is appropriate for the display screen size and orientation of mobile device 106. Layout processor 208 interacts with template module 210, dynamic form generator 212 and widget module 214.

Template module 210 includes templates 216. Templates 216 control the rendering of the media content in magazine edition 112. Templates 216 may be native templates that are optimized for executing on edition runner 202, as they use the core mobile device runtime 206 libraries. Templates 216 may also be publisher 120 designed templates that display media content a format designed by publisher 120. When magazine edition 112 is uploaded to mobile device 100, it stores templates 216 in template module 210.

Analytics module 217 tracks magazine editions 112, sections and articles within each magazine edition 112 viewed or read by a user. Analytics module 217 may compile a listing of the read content. The listing may be sent to publisher's 120 analytic account for determining edition content 132 that is interesting to users. The listing may also be sent to the user's account so that edition player 112 may provide a user with a history of edition content 132 that a user has read and/or accessed. Analytics module 217 may also track sections and articles within magazine editions 112 when a user browses magazine editions 112 offline (for example, without access to network 102). Once mobile device 106 is able to access network 102, analytics module 217 uploads the listing to publisher's 120 analytic account and/or user's account.

Edition distribution module 218 communicates with other applications, and distributes magazine editions 112 to third parties. Example third parties may include popular social networking sites, microblogging services, email accounts associated with users, etc., to name a few. Edition distribution module 218 may be accessed within magazine edition 112 when a user is reading a particular article or section and causes edition player 116 to distribute the read content.

Location tracker 220 identifies a location, such as latitude and longitude location of mobile device 106. Once the location of mobile devices 106 is identified, edition content 132 included in magazine edition 112 may be tailored to a location of mobile device 106.

Advertisement module 222 inserts advertisements into edition content 132 displayed by magazine edition 112. Advertisement module 222 determines where and when to include advertisements within magazine edition 112. For example, when layout processor 208 renders edition content 132 on a mobile device 106 in a way that includes an unfilled space, advertisement module 222 detects the unfilled space and queries an advertisement system to select an advertisement for inclusion in the unfilled space in real-time. Advertisement module 222 also communicates with various advertising entities that provide advertisement module 222 with advertisements for display within magazine edition 112.

Dynamic form generator 212 generates dynamic forms 213. Dynamic forms 213 render an arbitrary section within magazine edition 112 based on metadata provided by individual users. For example, dynamic forms 213 may be used to display submissions by individual users who, for example, practice citizen journalism.

Synchronization module 224 communicates with a studio backend 126 and retrieves edition content 132 from data storage 128. Synchronization module 224 also identifies the subscriptions that a user subscribed to using particular magazine editions 112 and synchronizes the edition content 132 included in the subscriptions with edition content 132 provided by content sources 118.

Widget module 214 enhances edition content 132 displayed in magazine edition 112. For example, when a slide show is included in edition content 132, widget module 214 renders the slide show. In another example, when edition content 132 includes geo-coordinates, widget module 214 launches an application that displays a map. In another example, when edition content 132 includes a video application, widget module 214 launches a video display application, etc. A person skilled in the art will appreciate that the embodiments above are given by way of example and not limitation and that other means for enhancing edition content 132 may be used.

Identification module 226 identifies a user that uses mobile device 106 and subscribes to particular magazine editions 112.

Preferences engine 228 determines the configuration of a user. For example, a user may configure time intervals for when magazine edition content is synchronized with studio backend 126.

Intent module 230 launches an application within edition runner 204 that a user wants to use to view edition content 132 in magazine edition 112. For example, when a user clicks on a post that includes a video, intent module 230 launches a video application. In another example, when a user wants to send an email, intent module 230 launches an email application.

Mobile device runtime 206 executes edition runnel 204. Mobile device runtime 206 is a runtime that is native to mobile device 106. Mobile device runtime 206 allows a user to use edition player 116 to view magazine editions 112 on mobile device 106. Typically, device 106 includes different mobile device runtimes 206 that execute mobile device 106 specific operating platforms.

Figure 3:
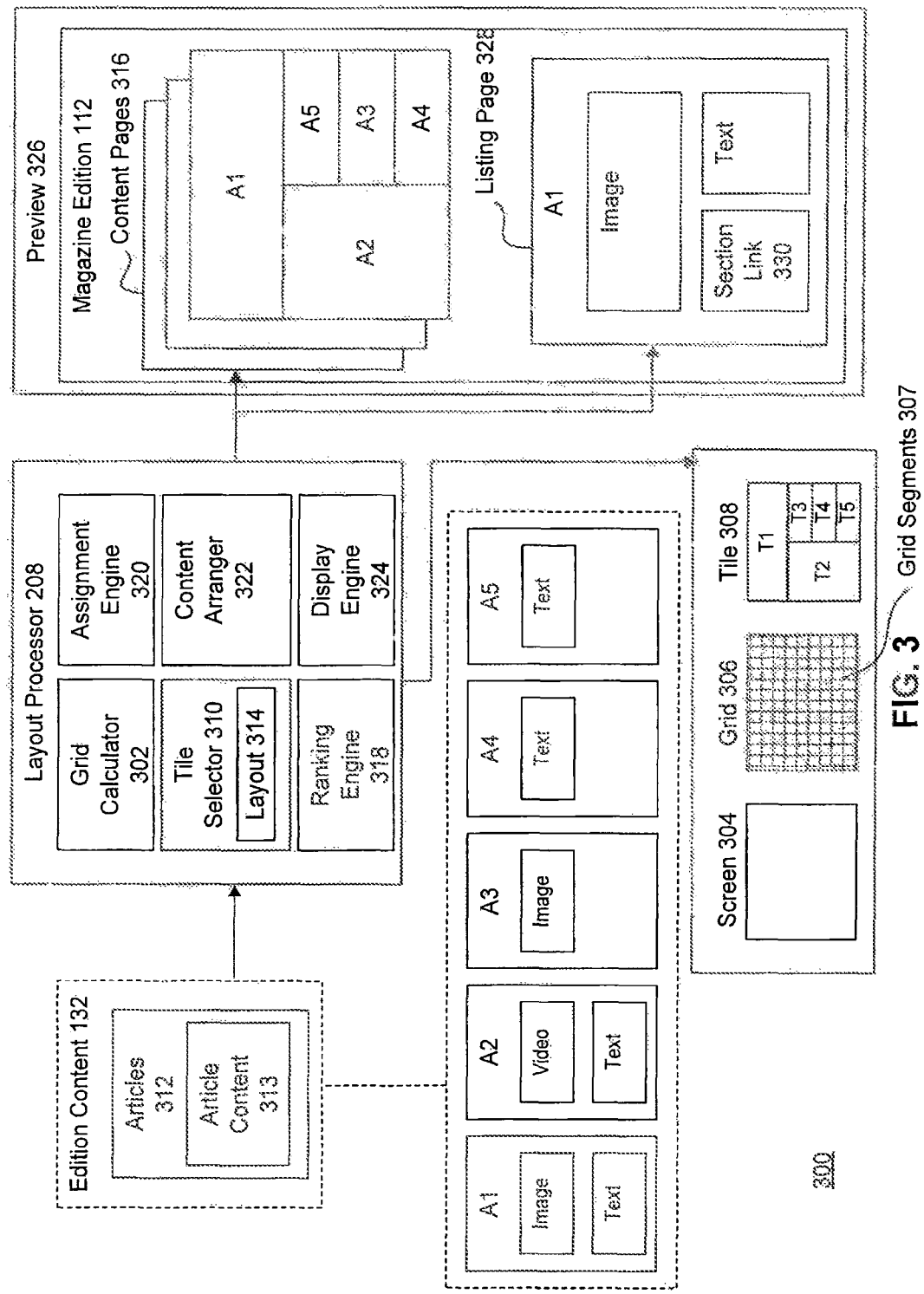
FIG. 3 is another block diagram of a system for displaying edition content of a magazine edition, according to an exemplary embodiment.

FIG. 3 is a block diagram of a system 300 for displaying edition content of a magazine edition, according to an exemplary embodiment. System 300 determines how edition content 132 is going to be laid out or otherwise styled within magazine edition 112. System 300 sections a screen 304 of a mobile device 106 into a grid 306, and uses grid segments 307 from the grid 306 to assemble tiles 308. Each the 308 may be assigned to an article 312, the contents of which (e.g., article content 313) is optimized or otherwise arranged for display on screen 304. System 300 may operate on studio backend 126.

As referenced above, layout processor 208 formats media content for display on mobile devices having different specifications or configurations. Layout processor 208 receives edition content 132, using, for example, an stream and generates a single or multi-column layout of edition content 132 that is appropriate for the size and orientation of a screen 304 of a mobile device 106.

A mobile device may include screen 304 upon which magazine edition 112 is to be rendered. Different mobile devices may have different screens 304, each of which may have different configurations. For example, the screens 304 of a laptop, mobile phone and tablet PC may each have different configurations for their respective screens 304. The configuration may include a size, shape, pixel density and orientation of the screen 304 (e.g., with respect to how a user is operating the mobile device). For example, a tablet PC may have a larger screen 304 than a mobile phone. Or, for example, two different models of mobile phones may have different dimensions and pixel densities. Or, for example, a mobile device may be operable in either a portrait orientation (in which the height of the screen 304 is greater than its width) or landscape orientation (in which the width of screen 304 is greater than its height).

Based on the configurations of screen 304, grid calculator 302 may calculate a grid 306 for screen 304. Grid 306 may include a framework that may be used to organize tiles 308 on screen 304. Grid calculator 302 may generate grid 306 based on the configuration of screen 304. For example, grid calculator 302 may generate grid 306 of a particular size and shape based on the dimensions of screen 304. Then, for example, grid calculator 302 may divide grid 306 into grid segments 307.

Grid segments 307 may be the smallest divisible portions of screen 304, as determined by grid calculator 302. One or more grid segments 307 may be grouped into a tile 308. Grid segments 307 may be individual pixels, groups of pixels, or other segments of screen 304. Grid segments 307 may be used to ensure proper alignment between tiles 308, each of which include one or more grid segments 307. Grid segments 307 may be of equal or different sizes.

Tile selector 310 groups grid segments 307 into one or more tiles 308. As just referenced, tile 308 may be one or more grid segments 307. A tile 308 may be assigned to render article content 313 of a particular article 312. For example, tile T1 may be assigned to render image of article A1, while tile T2 renders text from article A2. Or, for example, each tile 308 may be assigned to render all of the article content 313 of a particular article 312. Article content 313 may include any combination of text, images, video and other multimedia. For example, article A1 that includes an image and text, may be rendered in tile T1. As shown in the example articles A1-A5, each article 312 may include various combinations of text, images, and video. In an embodiment, publisher 120 provides edition content 132 which includes articles 312.

In an embodiment, tile selector 310 determines the different types of article content 313 included in the articles 312 and selects or generates tiles 308 on grid 306 based on the article content 313. For example, if article content 313 includes images, then tiles 308 are generated to accommodate the layout of those images, whether based on their shape (e.g., whether they are square, rectangular with a long vertical edge or long horizontal edge, or another non-rectangular shape). In another example, if article A4 includes short-form text, such as a tweet or status update, then tile selector 310 generates a smaller tile T4 to hold the short-form text.

In an embodiment, ranking engine 318 works in coordination with tile selector 310 to determine the layout 314 of tiles 308 on screen 304. Ranking engine 318 may rank articles 312 to determine which articles 312 are to be featured, or otherwise be assigned the biggest or most prominent tiles 308. Rankings may be based on media type, a time of article content, content length, content quality of if the content feed indicates it is the biggest feed.

In ranking articles 312, ranking engine 318 may rank articles 312 based on, their corresponding article content 313. In an example embodiment, various types of article content 313 may be associated with varying degrees of importance within magazine edition 112. For example, video may be ranked higher than images, which may be ranked higher than text. Correspondingly, ranking engine 318 may rank those articles 312 with video higher than those articles without video, articles 312 with images higher than those articles without images, and those articles 312 only with text the lowest.

In another example, the subject matter of the article content 313 may be ranked based on a general subject matter associated with magazine edition 112, or recent or popular subjects (e.g., recent news). In this situation, ranking engine 318 may determine the subject matter of a video, image or text, and rank the subject matter of the articles 312 against popular news items, or more recently created article content 313. Then for example, those articles 312 that have the more popular stories or article content 313 may be provided the most prominent tiles 308.

Based on the ranking (i.e., by ranking engine 318), tile selector 310 then divides grid 306 into tiles 308. Tile selector 310 gives the featured articles 312 (including highest ranked content 313 thereof) the most prominent tiles 308. For example, tile selector 310 receives the ranking of the five articles A1-A5 shown, with the articles 312 being ranked in order of most important to least important: A1, A2, A5, A3, and A4. Then, for example, based on the size of the article content 313 for each article 312 and its relative ranking, tile selector determines the tile layout shown.

The prominence of a particular tile 308 may correspond to its size and position on screen 304. In an embodiment, a more prominent tile 308 (as assigned to a higher ranked article 312) will include more grid segments 307 and/or a higher or more visible position on screen 304. With regards to relative position on screen corresponding to prominence, this may be determined based on how a user is likely to read magazine edition 112. For example, with English-based magazine editions 112, readers are likely to browse edition content 132 of a magazine edition 112 left-to-right and top-to-bottom. As such, the tiles located in the top-left portion of screen 304 may be considered more prominent than those located on the bottom-right side. Tile selector 310 may determine the size and position of tiles 308 from grid 306, based on the ranking, and size of content 313 of the articles 312.

Assignment engine 320 assigns the articles 312 to various tiles 308. For example, as, referenced above, articles 312 may be assigned to tiles 308 based on rankings. In an embodiment, ranking engine 318 ranks both tiles 308, based on relative prominence (e.g., based on size and location on grid 306), and articles 312. Assignment engine 320 then assigns the various articles 312 to the tiles 308 based on the rankings. For example, the highest ranked article 312 may be assigned to the highest ranked tile 308.

Content arranger 322 determines tile-content for each of the assigned articles 312 for display on a content page 316. Content arranger 322 may determine, select, arrange, resize, reshape, crop, or remove article content 313 and tiles 308. For example, content arranger 322 determines the relative positions of the image and text for article A1 in tile T1. Content arranger 322 may align the text to the right of the image, to the left of the image, above the image, or below the image. Or, for example, content arranger 322 may reduce the portion of the T1 assigned to the image, and thereby reduce the size of the image, while increasing the size of the T1 assigned to the text, or vice versa. In another embodiment, content arranger 322 may reduce the size of the font of the text to fit within a tile 308, down to a minimum size that may correspond to screen 304 or grid segments 307.

In an example, content arranger 322 determines that tile T2 is not big enough for all the tile-content of article A2 (e.g., is not big enough to fit both text and video of article A2). Content arranger 322 then determines that video is ranked higher than text in article A2, and may include only the video of article A2 as tile-content in tile T2. This may cause content arranger 322 to adjust the size of the video to fit within tile T2, and/or adjust the size of tile 12 to fit the video of A2. If the size of tile T2 is adjusted, this may cause content arranger 322 to make corresponding adjustments to tiles T1, T3, T4 and T5, depending on how the tile T2 is adjusted. Content arranger 322 may perform this latter adjustment to the remaining tiles 308 to ensure that the tiles 308 align with one another and that there is no unintended white space or misalignment among the tiles 308. Each the 308 may be adjusted by adding or removing the grid segments 307 assigned to each the 308.

Display engine 324 then displays a preview 326 of content pages 316. Content page 316 is a page or other portion of magazine edition 112 as viewable to a user on screen 304. For example, when reading or viewing magazine edition 112 on a mobile device, a user can only see one content page 316 on screen 304 at a time. However, magazine edition 112 may be enabled with a preview pane (not shown), allowing a user to see previous or subsequent content pages 314. Or, for example, magazine edition 112 may be enabled to allow a user to read or view two or more content pages 316 at a time.

Preview 326 may be a preview of content page 316 as it would appear on screen 304. Publisher 120 may view preview 326 and determine adjustments to be made to content page 316. For example, publisher 120 may add/remove articles 312 or article content 312, adjust tile 308 sizes and positions, or reassign articles 312 to different tiles 308. The changes by publisher 120 may then be received by layout processor 208 and reflected in preview 326. For example, if publisher 120 removes article A3 from content page 316, layout processor 208 may remove the corresponding tile T4, and readjust the number and sizes and location the remaining tiles T1, T2, T3 and T5 to account for only four articles appearing on content page 316. Or, for example, publisher 120 may increase the size of the T3, which may change the sizes the remaining tiles 308.

In an embodiment, preview 326 includes multiple previews of content page 316 as it may appear on different screens 304 associated with different mobile devices. For example, preview 326 may include a preview of content page 316 on both a tablet computer and a mobile phone. As the screen 304 on which content pages 316 varies, so does the sizes of the tiles 308 based on new grids 306. Then, for example, publisher 120 may adjust the settings (e.g., tile size and location and article 312 assignment) for a particular preview 326. The changes by publisher 120 to the content page 316 for the tablet may then be isolated from changes to the content page 316 for the mobile phone. Or, for example, publisher 120 may make changes that apply to the content page 316 as it appears on both devices.

In an embodiment, publisher 120 provides layout 314. Layout 314 may include any of the above-referenced tasks as associated with layout processor 208. For example, layout 314, may include an arrangement of tiles 308 as determined by, publisher 120. Then, assignment engine 320 may assign articles 312 to the determined tiles 308, as discussed above. Or, for example, layout 314 may include rankings of the articles 312 or an indication of which articles 312 are to be featured, and tile selector 310 may arrange tiles 308 accordingly. Layout 314 may allow publisher 120 to customize the layout of content page 316 as much, or as little as publisher 120 desires.

Layout processor 208 can optimize or otherwise arrange layout 314 for content pages 316 in the way that best represents the article content 313 included on content page 316. In an example embodiment, an article 312 may have its own particular layout 314 which may be determined by publisher 120 or layout processor 208 in the same manner as discussed above with regards to content page 316. For example, an article layout 314 may include a relative position and size of the article contents 313 for the article 312, as assigned to tiles 308 on a grid 306 for the article 312.

According to another embodiment, layout processor 208 generates a listing page 328. Listing page 328 may be a table of contents or summary of magazine edition 112. For example, magazine edition 112 may include multiple content pages 316, for which layout processor 208 may generate one or more listing pages 328. Magazine edition 112 may also have several sections, based on subject matter or themes. For example, a sports magazine edition may have sections for football, baseball, soccer and hockey. Listing page 328 may include a section link 330 to the various sections of magazine edition 112.

In generating listing page 328, ranking engine 318 may rank the various articles 312 and/or sections of magazine edition 112 to determine featured content (e.g., content that should be included on listing page 328 and the relative size of that content). Articles 312 may be ranked based on their prominence on various content pages 316 as referenced above with respect to tiles 308. For example, an article 312 assigned to a bigger tile 308 that is positioned near the top of a content page 316 may be ranked higher than an article 312 assigned to a smaller tile 308 on the lower portion of a different content page 316. Or, for example, articles 312 may be ranked based on length of text or other aspects of article content 313 as referenced above.

Sections may be ranked based on the number of articles 312 included in the section. In an embodiment, publisher 120 may designate one or more articles 312 or sections to be featured on listing page 328. One the featured articles 312 or sections are identified, tile selector 310 may organize tiles 308 for listing page 328 for which to assign the featured content. If, for example, publisher 120 designates too many sections or too many articles 312 as featured, then listing page 328 may span multiple pages and the content of each listing page 328 may be optimized or arranged to fully utilize the available space of the respective listing pages 328.

In the example listing page 328, article A1 was selected as the featured article, and the image and the text, or at least a portion thereof, such as the title and author, are generated on listing page 328. Listing page 328 may also include section link 330, which may include the headlines or titles of the articles 312 or sections of magazine edition 112, with links thereto. Then, for example, if viewing listing page 328 on screen 304, a selection of a section flak 330 may load a corresponding content page 316 of magazine edition 112. Similar to content page 316, a publisher 120 may adjust the layout of listing page 328, for which display engine 324 may generate corresponding previews 326. For example, publisher 120 may determine, select, arrange, resize, reshape, crop, or remove the content of listing page 328.

Figure 4:
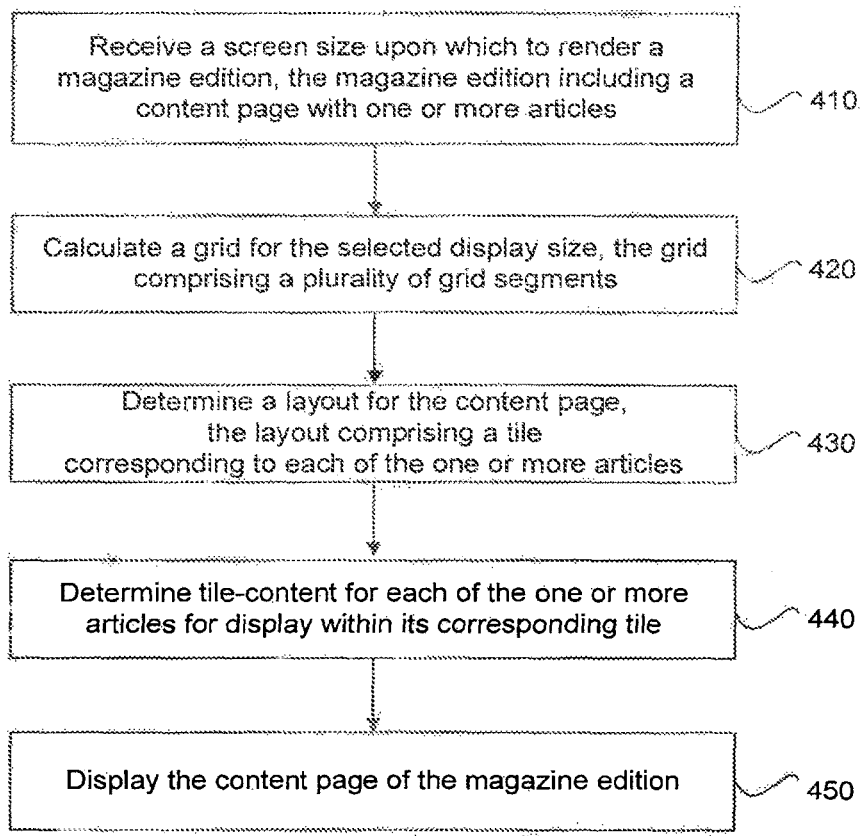
FIG. 4 is a flowchart of a method for displaying edition content of a magazine edition, according to an embodiment.

FIG. 4 is a flowchart of a method 400 for displaying edition content in a magazine edition, according to an embodiment. At step 410, a screen selection corresponding to a size of a screen upon which to render a magazine edition is received, the magazine edition including a content page with one or more articles. For example, layout processor 208 may receive size and dimension information for screen 304 of mobile device 106. Screen 304 may include size and other configuration information.

At step 420, a grid for the selected screen size is calculated, the grid comprising a plurality of grid segments. For example, grid calculator 302 any generate grid 306 including grid segments 307 based on the configuration of screen 304. In another example embodiment, grid calculator 320 may generate grid segments 307 based on article content 313 that is to be included on content page 316.

At step 430, a layout for the content page is determined, the layout comprising a tile corresponding to each of the one or more articles. For example, tile selector 310 may determine select tiles 308 from grid 306, each tile 308 including a selection of one or more of the in segments 307.

At step 440, the tile-content of each of the one or more articles is determined for display within its corresponding tile. For example, content arranger 322 may resize the tiles 308 and articles 312 to fit within their assigned or corresponding tiles 308, and may determine which content 313 to include in tiles 308. In an embodiment, an image may be provided in various sizes based on tile size or pixel density of screen 304. For example, a screen 304 with a higher pixel density or resolution may receive a more detailed version of an image, than a screen 304 with a lower pixel density.

At step 450, the content page of the magazine edition is displayed. For example, display engine 324 may generate preview 326 of magazine edition 112. Once publisher 120 is satisfied with preview 326, magazine edition 112 may be published or otherwise provided for distribution to mobile devices 106.

Figure 5:
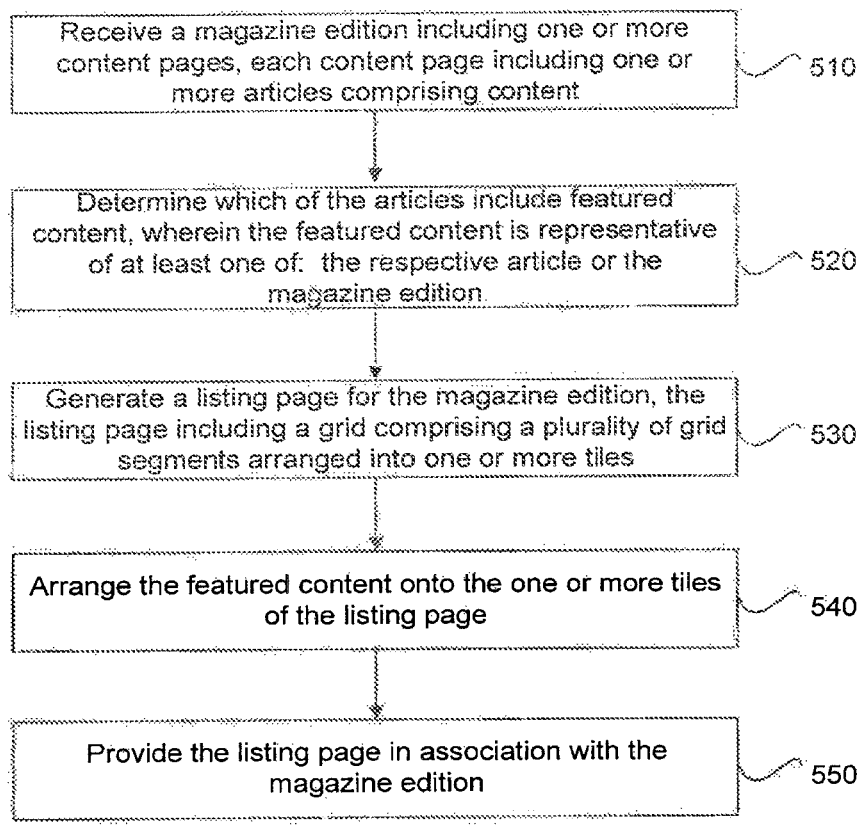
FIG. 5 is a flowchart of a method for displaying edition content of a magazine edition, according to an embodiment.

FIG. 5 is a flowchart of a method 500 for displaying edition content in a magazine edition, according to an embodiment. At step 510, a magazine edition including one or more content pages is received, each content page including one or more articles comprising content. For example, layout processor 208 may receive magazine edition 112. Magazine edition may include content pages 316 with various articles 312 laid out thereon.

At step 520, it is determined which of the articles include featured content. For example, ranking engine 318 may determine featured articles from among the articles 312 of magazine edition 112. Ranking engine 318 may rank the articles 312 based on a relative prominence of their associated tiles 308 on the various content pages 316. Or, for example, publisher 120 may indicate a primary subject matter for magazine edition 112, for which, articles 312 with article content 313 corresponding to the designated subject matter is ranked more highly. In another example embodiment, ranking engine 318 may rank article content 313 for a respective article 312 as to how representative it is of the article 312. For example, for article A2, ranking engine 318 may rank text (e.g., such as title of article A2) to be more representative of article A2 than the video.

At step 530, a listing page is generated for the magazine edition, the listing page including a grid comprising a plurality of grid segments arranged into one or more tiles. For example, grid calculator 302 may generate grid 306, including grid segments 307 for listing page 328. Then, for example, tile selector 310, may select and arrangement of tiles 308 based on which featured content and section links 330 are to be included on listing page 328.

At step 540, the featured content is arranged onto the one or more tiles of the listing page. For example, assignment engine 320 may assign the featured content to the various tiles 308 of listing page 328, and content arranger 322 may arrange the featured content and tiles 308 as necessary. In one example, listing page 328 may be a table of contents divided into, sections. Each section of the table of contents may correspond to sections of magazine edition 112, each including one or more articles 312. The table of contents may include a list of article 312 titles, or featured articles representative of a particular section on listing page 328. This may allow a user to quickly preview and navigate amongst the contents of magazine edition 112.

At step 550, the listing page is provided in association with the magazine edition. For example, when a user views magazine edition 112 on edition player 112 of a mobile device 106, user may first be presented with one or more listing pages 328. A user may then scroll to the next content page 310 of magazine edition 112, or may select a section link 330 from listing page 328 which may render the corresponding content page 316 on screen 304 of the user's mobile device 106.

Figure 6:
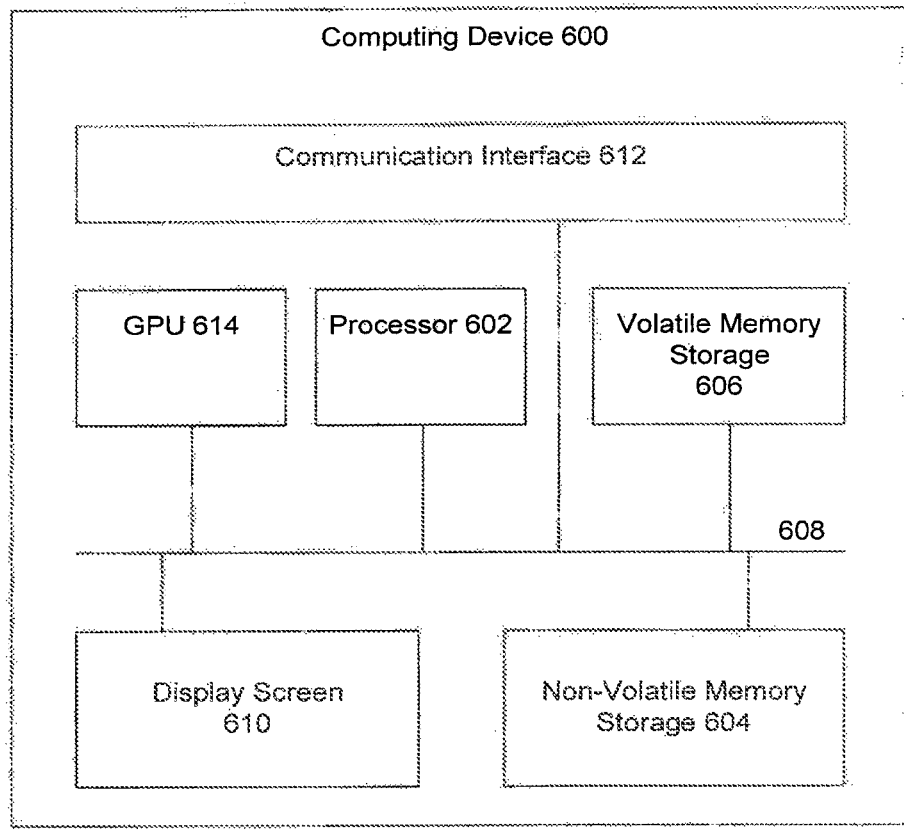
FIG. 6 is a block diagram of a computer system in which embodiments can be implemented.

FIG. 6 is an example computer system 600 in which embodiments of the present invention, or portions thereof, may be implemented as computer-readable code. For example, the components or modules of distributed system 100, such as studio UI 110, magazine editions 112, current module 115, studio backend 126, etc., may be implemented in one or more computer systems 600 using hardware, software, firmware, tangible computer-readable media having instructions stored thereon, or a combination thereof and may be implemented in one or more computer systems or other processing systems. Modules and components in FIGS. 1-5 may be embodied in hardware, software, or any combination thereof.

Mobile device 106, web server 104 and producer server 108 may include one or more computing devices that include a computer system 600. Computer system 600 may include one or more processors 602, one or more non-volatile storage mediums 604, one or more memory devices 606, a communication infrastructure 608, a display screen 610 and a communication interface 612.

Processors 602 may include any conventional or special purpose processor, including, but not limited to, digital signal processor (DSP), field programmable gate array (FPGA), and application specific integrated circuit (ASIC).

GPU 614 is a specialized processor that executes instructions and programs, selected for complex graphics and mathematical operations, in parallel.

Non-volatile storage 604 may include one or more of a hard disk drive, flash memory, and like devices that may store computer program instructions and data on computer-readable media. One or more of non-volatile storage device 604 may be a removable storage device.

Memory devices 606 may include one or more volatile memory devices such as but not limited to random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments may employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long, as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments as contemplated by the inventor(s), and thus, are not intended to limit the embodiments and the appended claims in any way.

The breadth and scope of the present embodiments should not be limited by any of the above-described exemplary embodiments, but should be defined only in accordance with the following claims and their equivalents.

What is claimed is:

1. A computer-implemented method comprising:
   determining content for display within a tiled interface, wherein the content is organized into a first article and a second article;
   determining a plurality of articles previously viewed by a user;
   identifying a relative importance of the first article and the second article based on the plurality of articles previously viewed by the user;
   determining a screen size for display of the tiled interface;
   determining grid segments of the tiled interface based on the content and the screen size;
   grouping the grid segments into tiles of the tiled interface based on a size and a layout of the content;
   identifying a prominent tile of the tiled interface for displaying the first article of the content that has a greater relative importance than the second article of the content, wherein a position of the prominent tile in the tiled interface is determined based on how a user is likely to browse the content;

adjusting a size of the prominent tile of the tiled interface to include more or less grid segments grouped into said prominent tile based on a content type of the first article; and displaying the first article of content within the prominent tile of the tiled interface.

2. The computer-implemented method of claim 1, further comprising:

determining the relative importance of the first article and the second article based on their association with recent or popular news.

3. The computer-implemented method of claim 1, further comprising:

determining the relative importance of the first article and the second article based on when the content of the first article and the second article was created.

4. The computer-implemented method of claim 1, wherein the position of the prominent tile in the tiled interface is determined based on whether the user is likely to browse the content left-to-right and top-to-bottom.

5. The computer-implemented method of claim 1, wherein at least one article of the content includes a combination of two or more of text, images, video, and multimedia.

6. The computer-implemented method of claim 1, wherein the content includes one of social networking data, data from an e-mail account, or a streaming video.

7. The computer-implemented method of claim 1, wherein the tiled interface comprises the tiled interface of a mobile device.

8. The computer-implemented method of claim 1, wherein the prominent tile displaying the first article is larger than a tile displaying the second article, and wherein the prominent tile displaying the first article is located higher on the tiled interface than the tile displaying the second article.

9. The computer-implemented method of claim 1, wherein at least one tile of the tiled interface includes an advertisement.

10. A system for displaying content comprising:
a layout processor configured to:
determine the content for display within a tiled interface, wherein the content is organized into a first article and a second article;
determine a plurality of articles previously viewed by a user;
identify a relative importance of the first article and the second article based on the plurality of articles previously viewed by the user;
determine a screen size for display of the tiled interface;
determine grid segments of the tiled interface based on the content and the screen size;
group the grid segments into tiles of the tiled interface based on a size and a layout of the content;
identify a prominent tile of the tiled interface for displaying the first article of the content that has a greater relative importance than the second article of the content, wherein a position of the prominent tile in the tiled interface is determined based on how a user is likely to browse the content;
adjusting a size of the prominent tile of the tiled interface to include more or less grid segments grouped into said prominent tile based on a content type of the first article; and
display the first article of content within the prominent tile of the tiled interface.

11. The system of claim 10, wherein the layout processor is further configured to:
determine the relative importance of the first article and the second article based on their association with recent or popular news.

12. The system of claim 10, wherein the layout processor is further configured to:
determine the relative importance of the first article and the second article based on when the content of the first article and the second article was created.

13. The system of claim 10, wherein the position of the prominent tile in the tiled interface is determined based on whether the user is likely to browse the content left-to-right and top-to-bottom.

14. The system of claim 10, wherein at least one article of the content includes a combination of two or more of text, images, video, and multimedia.

15. The system of claim 10, wherein the content includes at least one of social networking data, an e-mail account, or a streaming video.

16. The system of claim 10, wherein the tiled interface comprises the tiled interface of a mobile device.

17. The system of claim 10, wherein the prominent tile displaying the first article is larger than a tile displaying the second article, and wherein the prominent tile displaying the first article is located higher on the tiled interface than the tile displaying the second article.

18. The system of claim 10, wherein at least one tile of the tiled interface includes an advertisement.

19. A computer having at least one tangible memory and one processor operatively coupled to the tangible memory, the tangible memory including instructions that when executed by the processor cause the processor to:
determine content for display within a tiled interface, wherein the content is organized into a first article and a second article;
determine a plurality of articles previously viewed by a user;
identify a relative importance of the first article and the second article based on the plurality of articles previously viewed by the user;
determine a screen size for display of the tiled interface;
determine grid segments of the tiled interface based on the content and the screen size;
group the grid segments into tiles of the tiled interface based on a size and a layout of the content;
identify a prominent tile of the tiled interface for displaying the first article of the content that has a greater relative importance than the second article of the content, wherein a position of the prominent tile in the tiled interface is determined based on how a user is likely to browse the content;
adjusting a size of the prominent tile of the tiled interface to include more or less grid segments grouped into said prominent tile based on a content type of the first article; and
display the first article of content within the prominent tile of the tiled interface.

20. The computer of claim 19, wherein the content is stored on a mobile device, and wherein the tiled interface is displayed on the mobile device.

\* \* \* \* \*